(12) United States Patent
Heo

(10) Patent No.: US 9,246,544 B2
(45) Date of Patent: Jan. 26, 2016

(54) TRANSMISSION LINE HAVING VARIABLE CHARACTERISTIC IMPEDANCE

(71) Applicant: Innertron, Inc., Incheon (KR)

(72) Inventor: Kwang-Myoung Heo, Bucheon-si (KR)

(73) Assignee: Innertron, Inc., Incheon (KR)

( * ) Notice: Subject to any disclaimer, the term of this patent is extended or adjusted under 35 U.S.C. 154(b) by 294 days.

(21) Appl. No.: 13/849,363

(22) Filed: Mar. 22, 2013

(65) Prior Publication Data
US 2014/0266501 A1 Sep. 18, 2014

(30) Foreign Application Priority Data

Mar. 14, 2013 (KR) ........................ 10-2013-0027527

(51) Int. Cl.
*H01P 5/12* (2006.01)
*H04B 3/21* (2006.01)

(52) U.S. Cl.
CPC ........................................ *H04B 3/21* (2013.01)

(58) Field of Classification Search
CPC .......... H04B 3/21; H03H 9/46; H01P 1/2138; H01P 1/2135; H01P 1/20381
USPC .................. 333/126–129, 139, 140, 144, 204
See application file for complete search history.

(56) References Cited

U.S. PATENT DOCUMENTS 7,212,789 B2 * 5/2007 Kuffner ........................ 455/83

FOREIGN PATENT DOCUMENTS

| JP | 2007-295368 A | 11/2007 |
| KR | 1992-0007593 | 10/1992 |
| KR | 1992-0007593 Y1 | 10/1992 |
| KR | 2009-0037602 | 4/2009 |
| KR | 2009-0037602 A | 4/2009 |
| KR | 2012-0136395 | 12/2012 |

OTHER PUBLICATIONS

Korean Office Action dated Feb. 21, 2014 for Korean Patent Application No. 10-2013-0027527 which corresponds to the captioned U.S. Appl. No. 13/849,363.
Notice of Allowance dated Sep. 4, 2014 issued in corresponding Korean Patent Application No. 10-2013-0027527.

* cited by examiner

*Primary Examiner* — Robert Pascal
*Assistant Examiner* — Kimberly Glenn
(74) *Attorney, Agent, or Firm* — Knobbe, Martens, Olson & Bear, LLP

(57) ABSTRACT

Discloses are a transmission line having variable characteristic impedance and a combiner configured to combine a plurality of filter by use of the transmission line. The transmission line in accordance with an embodiment of the present invention includes: a first filter junction being connected with a first RF filter and configured to obtain an output signal of the first RF filter; a second filter junction being connected with a second RF filter and configured to obtain an output signal of the second RF filter; a first variable impedance section in which a phase of the output signal of the first RF filter is matched with a preset phase; and a second variable impedance section in which a phase of the output signal of the second RF filter is matched with the preset phase.

11 Claims, 9 Drawing Sheets

TRANSMISSION LINE HAVING VARIABLE CHARACTERISTIC IMPEDANCE

CROSS-REFERENCE TO RELATED APPLICATIONS

This application claims the benefit of Korean Patent Application No. 10-2013-0027527, filed with the Korean Intellectual Property Office on Mar. 14, 2013, the disclosure of which is incorporated herein by reference in its entirety.

BACKGROUND

1. Technical Field

The present invention relates to a high-frequency signal transmission line, more specifically to a transmission line having variable characteristic impedance and a combiner for combining a plurality of filters using the same.

2. Background Art

RF signal transmitters used for mobile communication base stations divide the output signal into a plurality of identical signals, amplify the divided signals and recombine these signals, in order to increase the transmission output.

A base station transceiver of a mobile communication system is constituted with a splitter for splitting an inputted RF signal such as a subscriber signal, a power amplifier for high-power-amplifying each of the RF signals split by the splitter, and a combiner for combining the RF signals amplified by the power amplifier.

In the conventional base station base station transceiver, the power amplifier high-power-amplifies each of the RF signals split by the splitter, and then the RF signals high-power-amplified by the power amplifier are combined and outputted through the combiner.

The combiner uses simple power distribution and combining technologies, and thus shows a good signal combining property only when RF signals having identical signal characteristics, i.e., identical amplitude, identical time delay and identical phase, are inputted. When the signal characteristics are different from one another, the combining property is degraded, and reflected wave signals are inputted to the power amplifier.

The frequency band provided to mobile communication services can be constituted with a plurality of non-contiguous sub-frequency bands. Accordingly, a plurality of band pass filters (BPF) are used to filter out frequency bands that are not used for the services, and signals that have passed through the plurality of BPFs are combined to a single signal and transmitted through the combiner.

As various bands of frequencies, ranging from a few hundred MHz to a few GHz, are used in mobile communication services, problems caused by different signal characteristics can occur when various output signals that have passed through the plurality of BPFs are combined to and transmitted as a single signal.

SUMMARY

The present invention provides a combiner that can solve problems caused by different signal characteristics when signals from a plurality of frequency bands are combined and transmitted.

The present invention also provides a combiner that can solve an interference problem between filters that can be occurred when band pass filters for different frequency bands are combined.

The present invention also provides a transmission line having variable characteristic impedance that can be used for combining a plurality of frequency filters having different pass bands.

An aspect of the present invention features a transmission line. The transmission line in accordance with an embodiment of the present invention includes: a first filter junction being connected with a first RF filter and configured to obtain an output signal of the first RF filter; a second filter junction being connected with a second RF filter and configured to obtain an output signal of the second RF filter; a first variable impedance section in which a phase of the output signal of the first RF filter is matched with a preset phase; and a second variable impedance section in which a phase of the output signal of the second RF filter is matched with the preset phase.

The transmission line can also include an output terminal configured to output a signal in which the output signal of the first RF filter matched with the preset phase is combined with the output signal of the second RF filter matched with the preset phase, and impedance viewed by the output terminal can be set to be 50Ω or 70Ω.

The first variable impedance section can be formed between the first filter junction and the second filter junction, and the second variable impedance section can be formed between the second filter junction and the output terminal of the transmission line.

The first filter can be a band pass filter.

The first RF filter or the second RF filter can be a band pass filter including a plurality of non-contiguous frequency bands as pass bands.

The first RF filter and the second RF filter can be band pass filters including frequency bands provided for mobile communication services as pass bands.

Characteristic impedance of the first variable impedance section can be determined according to the phase of the output signal of the first RF filter, and characteristic impedance of the second variable impedance section can be determined according to the phase of the output signal of the second RF filter.

The first variable impedance section and the second variable impedance section can have at least one of a diameter, a shape and a material that is different from each other based on the determined characteristic impedance.

Another aspect of the present invention features a combiner. The combiner in accordance with an embodiment of the present invention includes: a first band pass filter including at least one pass band; a first filter junction configured to obtain an output signal of the first band pass filter; a second band pass filter including at least one pass band; a second filter junction configured to obtain an output signal of the second band pass filter; a first variable impedance section in which a phase of the output signal of the first band pass filter is matched with a preset phase; a second variable impedance section in which a phase of the output signal of the second band pass filter is matched with the preset phase; and an output terminal configured to output a signal in which the output signal of the first band pass filter matched with the preset phase is combined with the output signal of the second band pass filter matched with the preset phase.

Impedance of the combiner viewed by the output terminal can be 50Ω or 70Ω.

The first band pass filter and the second band pass filter can be band pass filters including frequency bands provided for mobile communication services as pass bands.

Characteristic impedance of the first variable impedance section can be determined according to the phase of the output signal of the first band pass filter, and characteristic impedance of the second variable impedance section can be determined according to the phase of the output signal of the second band pass filter.

DETAILED DESCRIPTION

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the ideas and scope of the present invention.

Throughout the description of the present invention, when describing a certain technology is determined to evade the point of the present invention, the pertinent detailed description will be omitted. Terms such as "first" and "second" can be used in describing various elements, but the above elements shall not be restricted to the above terms. The above terms are used only to distinguish one element from the other.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between. Hereinafter, certain embodiments of the present invention will be described in detail with reference to the accompanying drawings.

Figure 1:
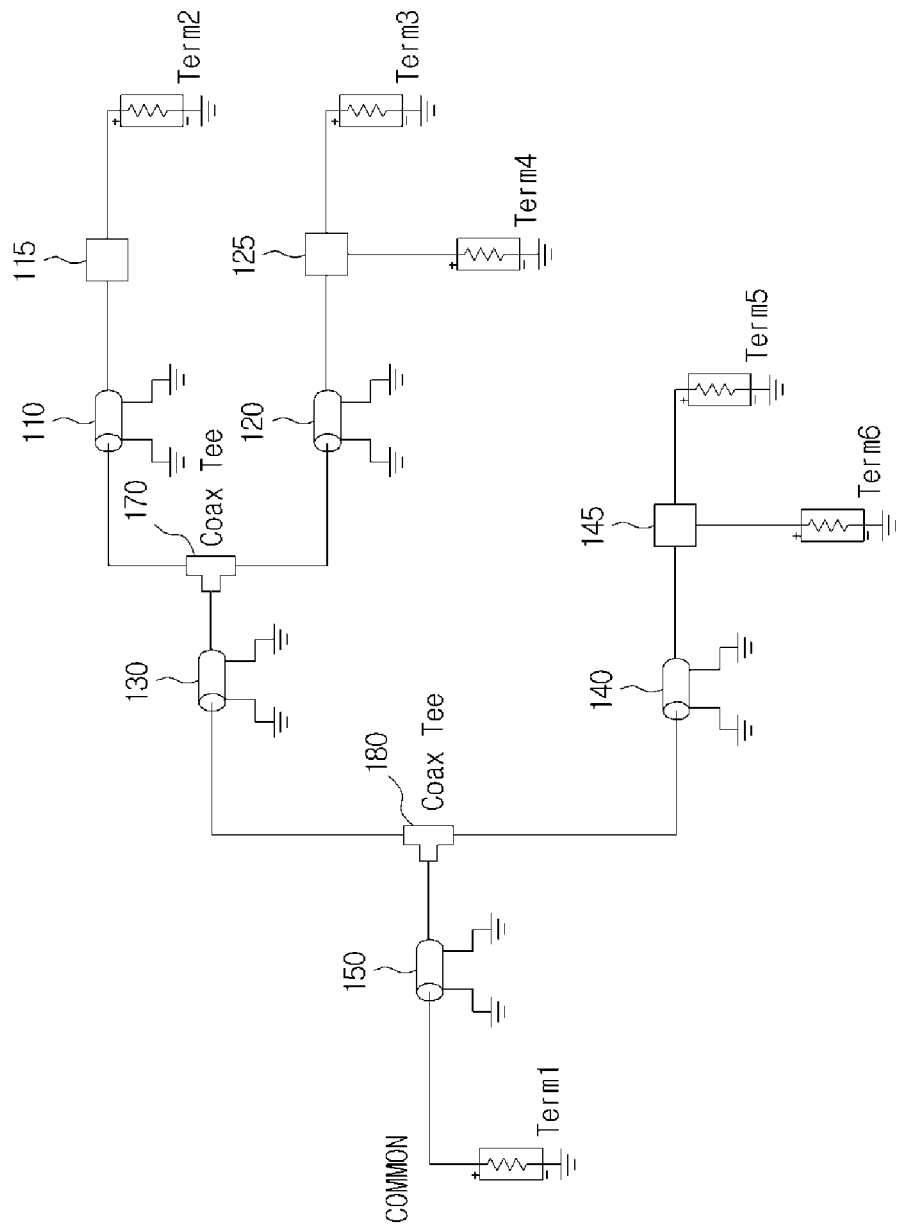
FIG. 1 shows an example of a combiner in which a plurality of filters is combined.

FIG. 1 shows an example of a combiner in which a plurality of filters is combined.

By combining a plurality of filters, the combiner shown in FIG. 1 combines output signals of the filters into one signal, allowing the combined signal to be outputted through a common terminal. Each of the filter groups 115, 125, 145 shown in FIG. 1 includes at least one filter. In FIG. 1, the filter group marked by reference numeral 115 can have a first band pass filter, of which the pass band is a first band, installed therein. The filter group marked by reference number 125 can have a second band pass filter, of which the pass band is a second band, and a third band pass filter, of which the pass band is a third band, installed therein. The filter group marked by reference number 145 can have a fourth band pass filter, of which the pass band is a fourth band, and a fifth band pass filter, of which the pass band is a fifth band, installed therein.

The band pass filters included in the filter groups can be realized using passive devices and/or active devices or through a resonator installed inside a main body of housing.

Signals having passed through the first band pass filter of the filter group 115 have frequencies of the pass band of the first band pass filter. Likewise, signals having passed through the filter group 125 have frequencies of the pass band of the second band pass filter and frequencies of the pass band of the third band pass filter. Signals having passed through the filter group 145 have frequencies of the pass band of the fourth band pass filter and frequencies of the pass band of the fifth band pass filter. Said first to fifth pass bands can be frequency bands used for mobile communication services, for example, 800 MHz, 900 MHz, 1.8 GHz, 2.1 GHz and 2.6 GHz.

When the signals having different frequency bands are to be combined into and transmitted as a single signal, problems can rise in impedance matching and phase matching of the signals. If the impedance matching is not properly made at connection terminals when RF signals are transmitted, the signals may be reflected at the connections terminals. Therefore, resistance viewed from the connection terminals (an input terminal and an output terminal) in an RF circuit normally needs to be matched with particular impedance. The particular impedance can be 50Ω or 75Ω.

Reference numerals 110, 120, 130 and 140 in FIG. 1 are phase lines inserted for impedance matching and phase matching. A phase line marked by reference numeral 110 is inserted for impedance matching and phase matching of the signals having passed the filter group 115, and a phase line marked by reference numeral 120 is inserted for impedance matching and phase matching of the signals having passed the filter group 125.

A coaxial T-junction marked by reference numeral 170 performs a function of joining signals that are impedance-matched and phase-matched by the phase lines 110, 120. Similarly, a coaxial T-junction marked by reference numeral 180 joins signals that are impedance-matched and phase-matched by the phase lines 130, 140. A phase line marked by reference numeral 150 is inserted for adjusting impedance viewed from a common terminal to particular impedance.

The phase lines shown in FIG. 1 fulfill the impedance matching by matching impedance viewed from connection terminals to particular impedance and fulfill the phase matching by adjusting the lengths of the phase lines.

When a plurality of filters are to be combined, the filters are combined in a tree-like configuration, as shown in FIG. 1, and thus a plurality of phase lines can be used. Use of the plurality of phase lines makes it difficult to decrease the size of the combiner and causes the cost of realization to increase. Moreover, due to the phase lines inserted to match the phases of output signals from the plurality of filters, it is not possible to control a frequency band in which a spurious component is generated.

The spurious component refers to any signal component existing outside intended frequency bands as well as unnecessary high harmonic waves and sub-harmonic waves other than targeted frequencies. In a combiner constituted with a plurality of band pass filters, if the spurious component of any one filter occurs in a pass band of another band pass filter, said spurious component can interfere with signals of said pass band of said another band pass filter. In the example of a combiner illustrated in FIG. 1, since the plurality of filters are combined using the plurality of phase lines in a tree-like configuration, the spurious component occurred in any one band pass filter can occur in a pass band of another band pass filter.

Figure 2:
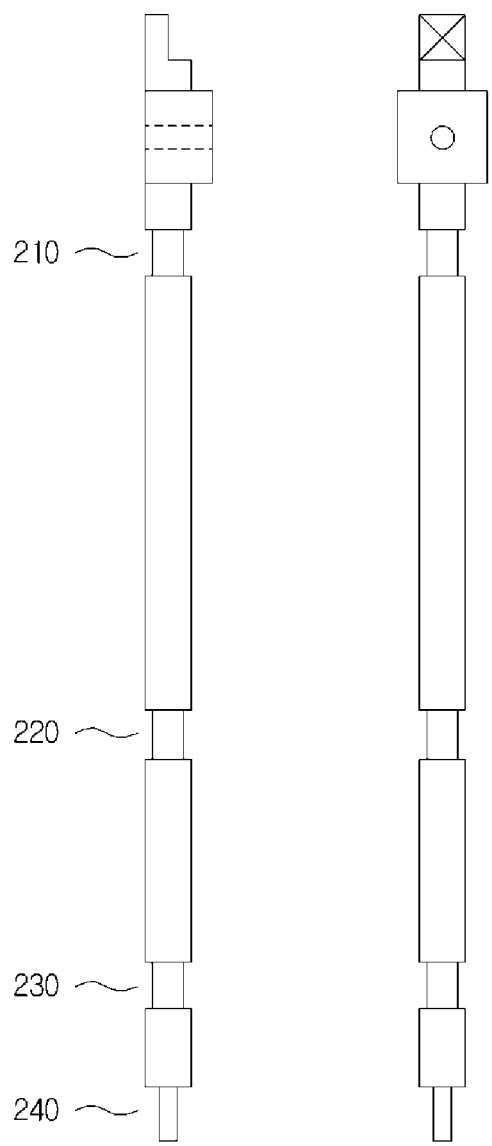
FIG. 2 shows a transmission line having variable characteristic impedance in accordance with an embodiment of the present invention.

FIG. 2 shows a transmission line having variable characteristic impedance in accordance with an embodiment of the present invention.

The transmission line in accordance with an embodiment of the present invention includes a plurality of filter junctions 210, 220, 230, 240 and variable characteristic impedance sections. A band pass filter is connected to a filter junction to send a signal that has passed through a filter to the transmission line. Each of the variable characteristic sections is set to an impedance value such that signals are phase-matched. For setting the impedance, the diameter of the transmission line can be configured to be different for each variable characteristic impedance section. In other embodiments, the transmission line can have a different material for each of the variable characteristic impedance sections or a different structural shape (i.e., a cross-sectional shape) for each of the variable characteristic impedance sections.

In the transmission line in accordance with an embodiment of the present invention, the impedance of the entire transmission line viewed from an output terminal of the transmission line has a preset fixed value (e.g., 50Ω or 70Ω), but the variable characteristic impedance sections between the filter junctions that receive input signals from filters that are connected to the transmission line can have impedance values that are in excess of or fall short of the preset fixed value. In each of the variable characteristic impedance sections, at least one of its length, diameter and cross-sectional shape can be adjusted for phase matching of the signal inputted through the filter junction.

The combiner using the transmission line having variable characteristic impedance in accordance with an embodiment of the present invention can have a shorter overall length of the transmission line than the combiner shown in FIG. 1 using the plurality of phase lines. Accordingly, it is more advantageous to reduce the size of the combiner, and various types of filters can be readily connected. Moreover, the number of filters connected to the transmission line can be easily increased. In other words, unlike the tree-like or hierarchy structure shown in FIG. 1, the combiner in accordance with an embodiment of the present invention allows a plurality of filter junctions to be configured in a single transmission line for combination with output of filters, and thus there is less restriction in the number of filters to be combined, the types of filters and the types of combiners.

Figure 3:
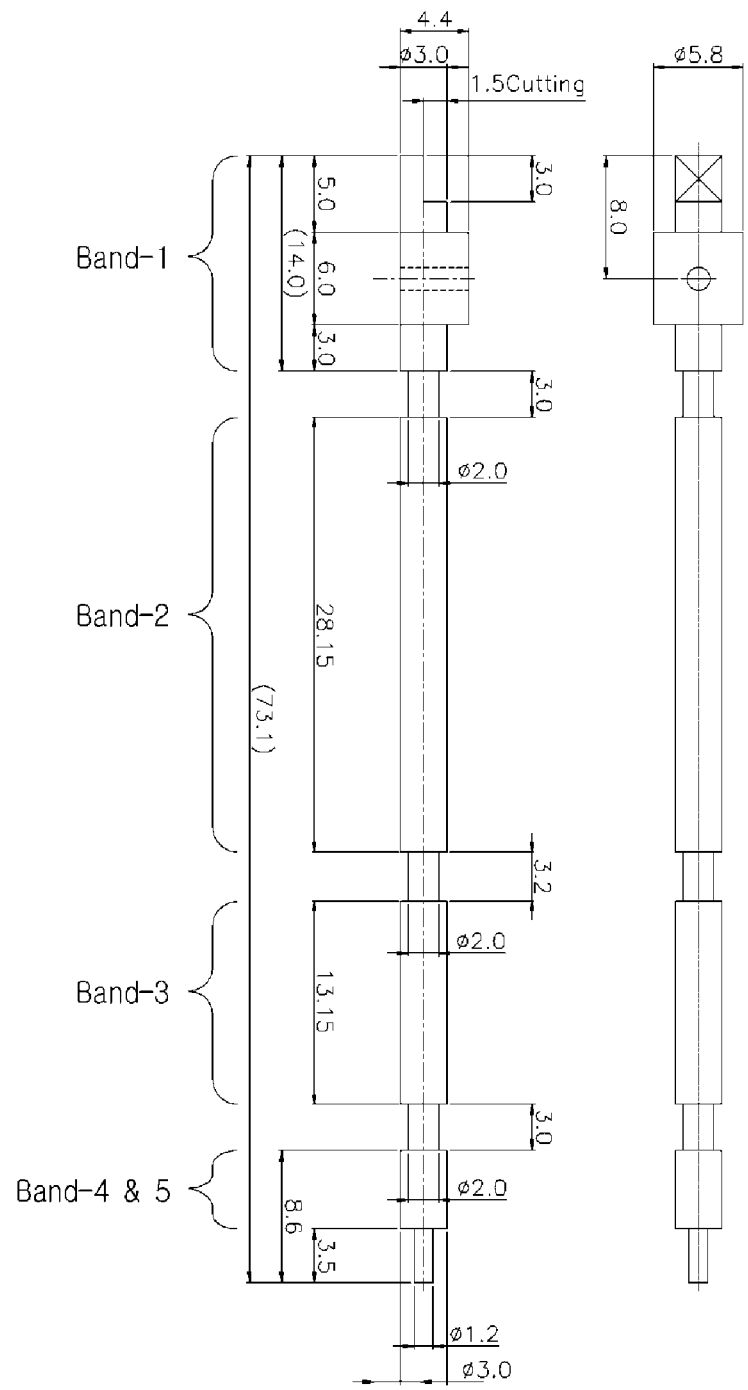
FIG. 3 and FIG. 4 show transmission lines having variable characteristic impedance in accordance with other embodiments of the present invention.
Figure 4:
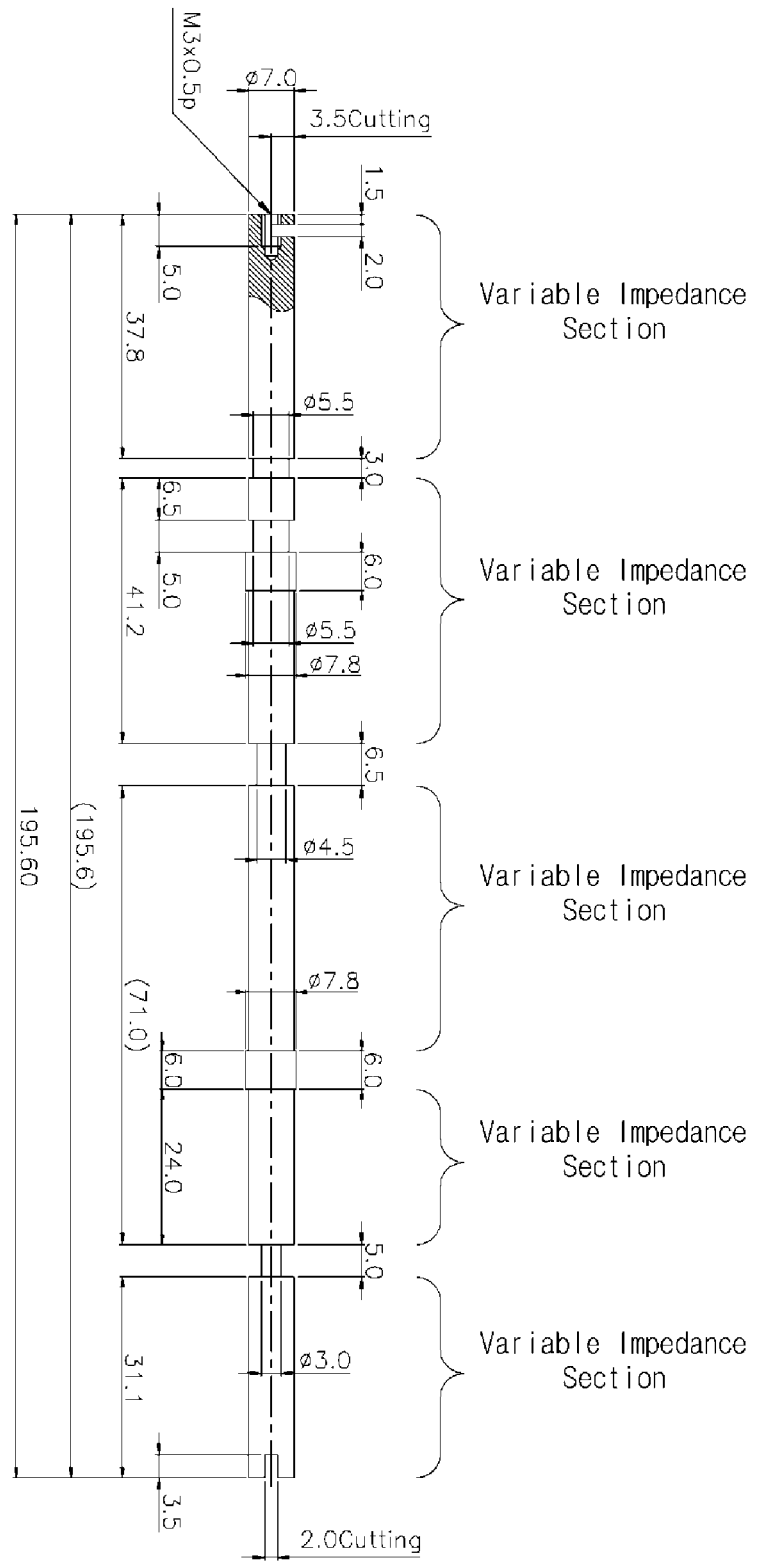
Figure 5:
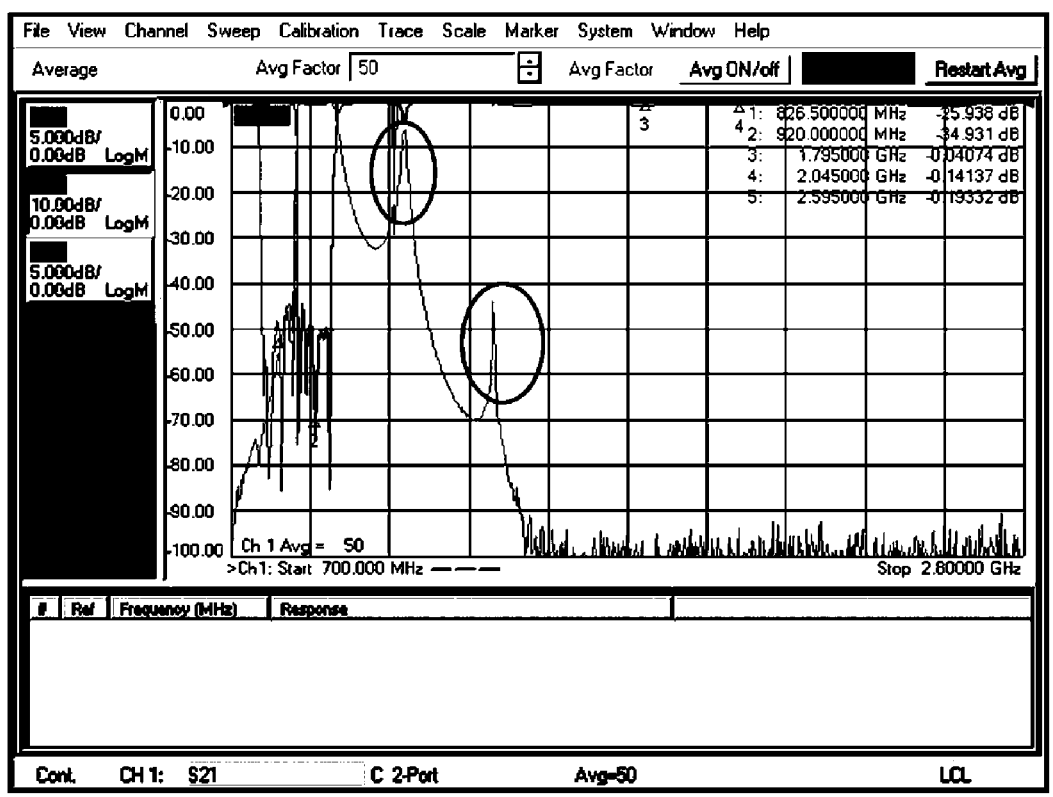
FIGS. 5 to 8 show examples of how a spurious component generated by one filter is generated and works as interference in a pass band of another filter.
Figure 6:
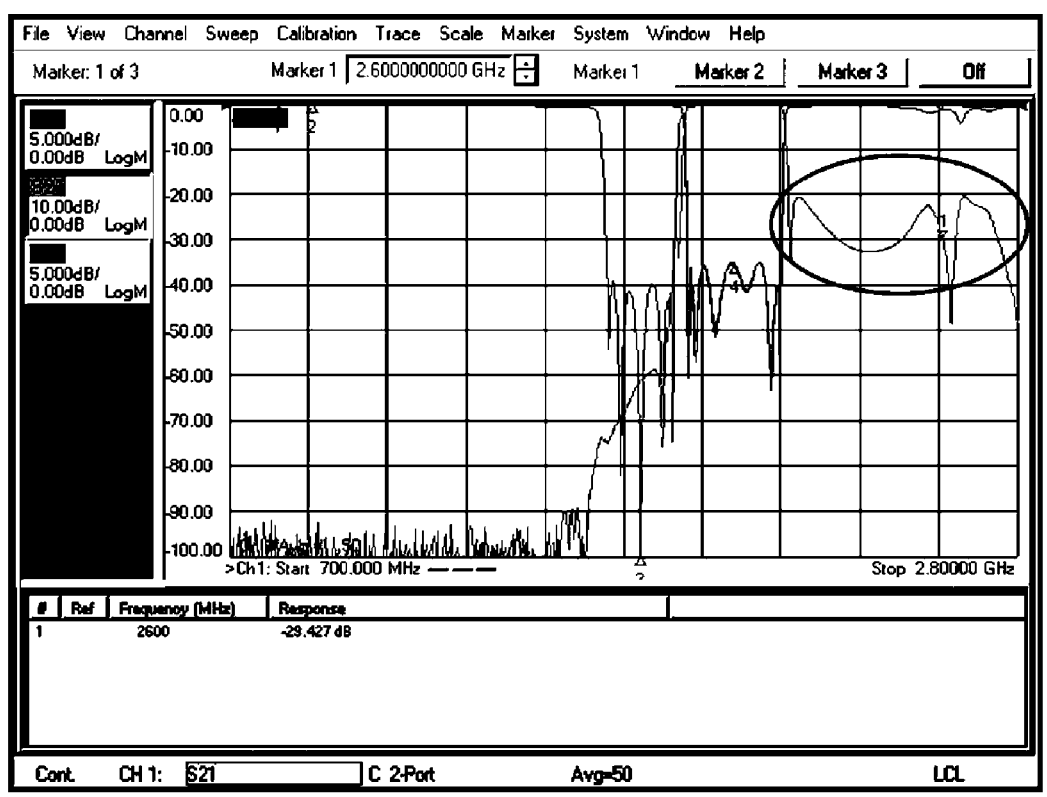
Figure 7:
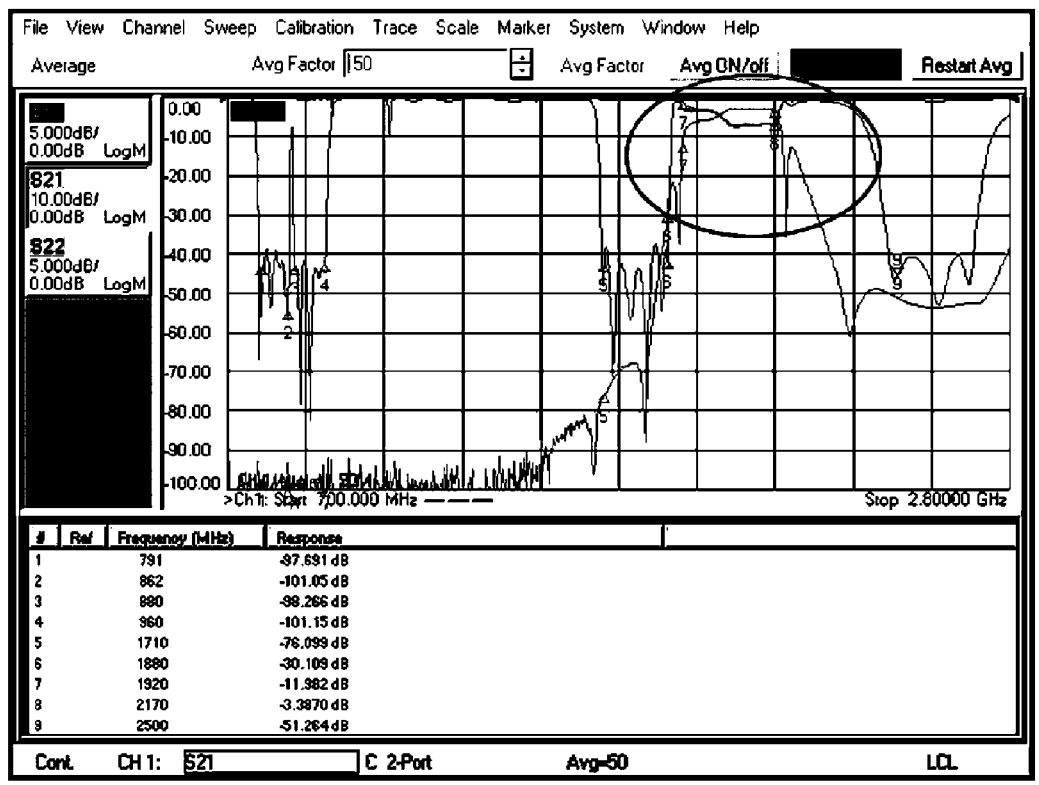
Figure 8:
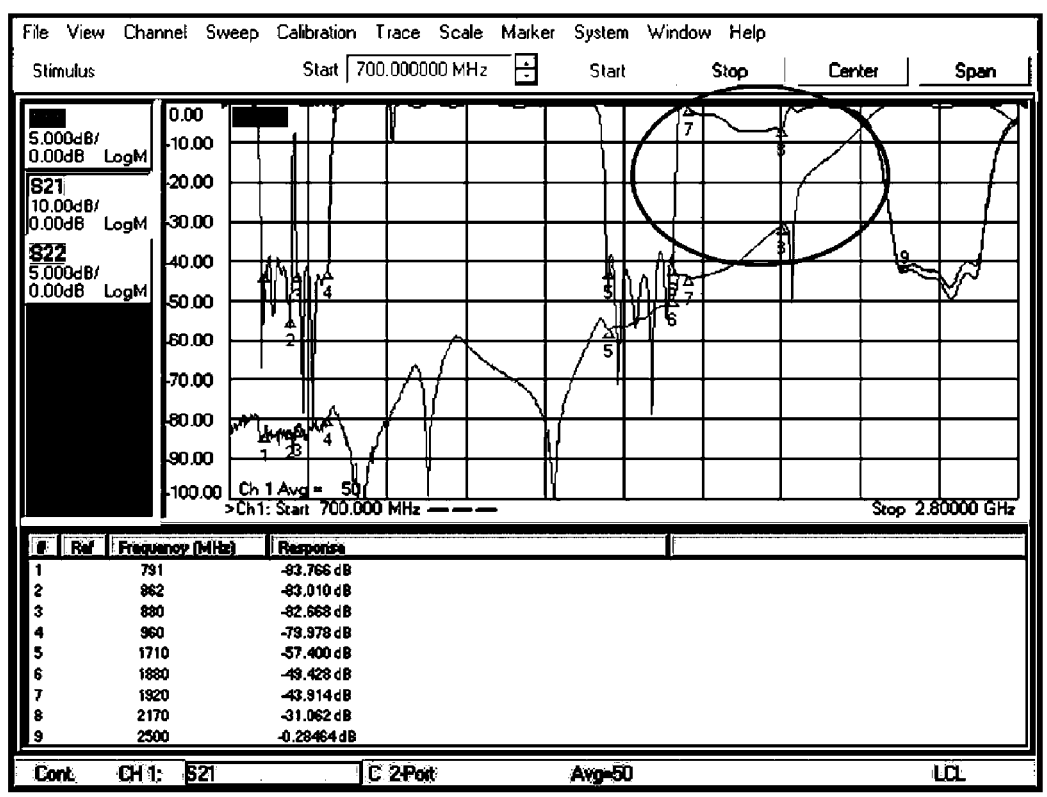

FIG. 3 and FIG. 4 show transmission lines having variable characteristic impedance in accordance with other embodiments of the present invention.

Examples shown in FIG. 3 and FIG. 4 are specific examples of transmission lines that can be applied in a combiner being combined with 5 band pass filters having pass bands of 800 MHz, 900 MHz, 1.8 GHz, 2.1 GHz and 2.6 GHz, which are frequency bands provided for mobile communication services. The transmission lines shown in FIG. 3 and FIG. 4 include variable impedance sections between filter junctions, and the impedance viewed from an output terminal of the transmission line is 50Ω.

Figure 9:
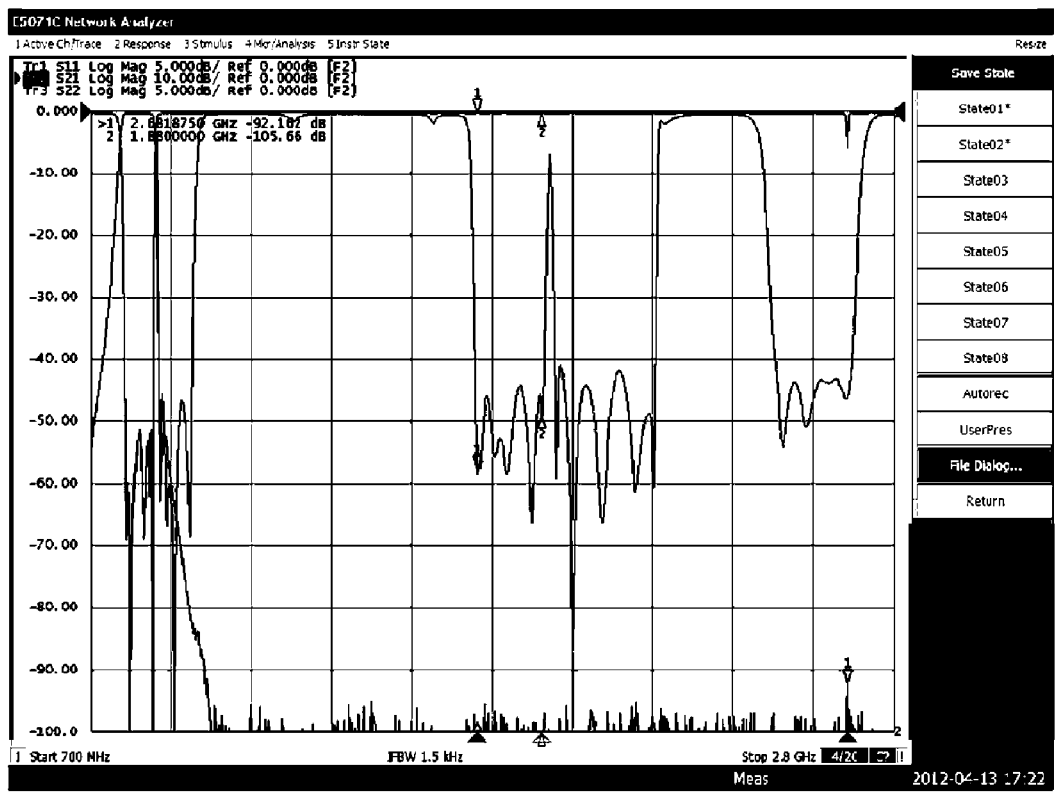
FIG. 9 shows a graph of an output of a combiner in which the transmission line having variable characteristic impedance in accordance with an embodiment of the present invention is applied.

FIGS. 5 to 8 show examples of how a spurious component generated by one filter is generated and works as interference in a pass band of another filter, and FIG. 9 shows a graph of an output of a combiner in which the transmission line having variable characteristic impedance in accordance with an embodiment of the present invention is applied.

The areas marked by circles in the graphs shown in FIGS. 5 to 8 indicate spurious components generated in the frequency bands provided for mobile communication services. When a spurious component generated by one filter is generated in a pass band of another filter, the signal quality of said band can be deteriorated by the spurious component. Interference by the spurious component lowers the signal-to-noise ratio (SNR) of the pertinent band signal. This is occurred because the position where the spurious components is generated cannot be controlled when the plurality of filters are combined as shown in FIG. 1, and this problem can be solved by applying the combiner using the transmission line having variable characteristic impedance in accordance with an embodiment of the present invention.

Referring to the graph shown in FIG. 9, it can be seen that the spurious components are occurred in bands outside the pass bands of the filters combined by the combiner in accordance with an embodiment of the present invention and thus do not work as interference for the signals that have passed through the filters.

The embodiments described above include a wide variety of forms. Although it is not possible to describe all possible combinations to illustrate the variety of forms, it shall be appreciated by those who are ordinarily skilled in the art to which the present invention pertains that other combinations are possible. Therefore, it shall be appreciated that the present invention encompasses all other substitutions, modifications and permutations that belong to the claims appended below.

What is claimed is:

1. A transmission line comprising:
   a first filter junction being connected with a first RF filter and configured to obtain an output signal of the first RF filter;
   a second filter junction being connected with a second RF filter and configured to obtain an output signal of the second RF filter;
   a first variable impedance section in which a phase of the output signal of the first RF filter is matched with a preset phase; and
   a second variable impedance section in which a phase of the output signal of the second RF filter is matched with the preset phase,
   wherein the first variable impedance section is formed between the first filter junction and the second filter junction, and
   wherein the second variable impedance section is formed between the second filter junction and the output terminal of the transmission line.

2. The transmission line of claim 1, wherein the first filter is a band pass filter.

3. The transmission line of claim 1, wherein the first RF filter or the second RF filter is a band pass filter including a plurality of non-contiguous frequency bands as pass bands.

4. The transmission line of claim 1, wherein the first RF filter and the second RF filter are band pass filters including frequency bands provided for mobile communication services as pass bands.

5. The transmission line of claim 1, wherein characteristic impedance of the first variable impedance section is determined according to the phase of the output signal of the first RF filter, and
   wherein characteristic impedance of the second variable impedance section is determined according to the phase of the output signal of the second RF filter.

6. The transmission line of claim 5, wherein the first variable impedance section and the second variable impedance section have at least one of a diameter, a shape and a material that is different from each other based on the determined characteristic impedance.

7. A transmission line comprising:
   a first filter junction being connected with a first RF filter and configured to obtain an output signal of the first RF filter;

a second filter junction being connected with a second RF filter and configured to obtain an output signal of the second RF filter;

a first variable impedance section in which a phase of the output signal of the first RF filter is matched with a preset phase;

a second variable impedance section in which a phase of the output signal of the second RF filter is matched with the preset phase; and an output terminal configured to output a signal in which the output signal of the first RF filter matched with the preset phase is combined with the output signal of the second RF filter matched with the preset phase, wherein impedance viewed by the output terminal is set to be 50Ω or 70Ω.

8. A combiner comprising:

a first band pass filter including at least one pass band;

a first filter junction configured to obtain an output signal of the first band pass filter;

a second band pass filter including at least one pass band;

a second filter junction configured to obtain an output signal of the second band pass filter;

a first variable impedance section in which a phase of the output signal of the first band pass filter is matched with a preset phase;

a second variable impedance section in which a phase of the output signal of the second band pass filter is matched with the preset phase; and an output terminal configured to output a signal in which the output signal of the first band pass filter matched with the preset phase is combined with the output signal of the second band pass filter matched with the preset phase.

9. The combine of claim 8, wherein impedance of the combiner viewed by the output terminal is 50Ω or 70Ω.

10. The combiner of claim 8, wherein the first band pass filter and the second band pass filter are band pass filters including frequency bands provided for mobile communication services as pass bands.

11. The combiner of claim 8, wherein characteristic impedance of the first variable impedance section is determined according to the phase of the output signal of the first band pass filter, and wherein characteristic impedance of the second variable impedance section is determined according to the phase of the output signal of the second band pass filter.

* * * * *